(12) United States Patent
Ma

(10) Patent No.: US 11,293,487 B2
(45) Date of Patent: Apr. 5, 2022

(54) SLIDER

(71) Applicant: Erik Jiandong Ma, Bellevue, WA (US)

(72) Inventor: Erik Jiandong Ma, Bellevue, WA (US)

( * ) Notice: Subject to any disclaimer, the term of this patent is extended or adjusted under 35 U.S.C. 154(b) by 0 days.

(21) Appl. No.: 17/113,052

(22) Filed: Dec. 6, 2020

(65) Prior Publication Data
US 2021/0199156 A1 Jul. 1, 2021

Related U.S. Application Data

(60) Provisional application No. 62/953,890, filed on Dec. 26, 2019.

(51) Int. Cl.
*F16C 29/04* (2006.01)

(52) U.S. Cl.
CPC .......... *F16C 29/04* (2013.01); *F16C 2322/59* (2013.01)

(58) Field of Classification Search
CPC ...... F16C 29/04; F16C 29/043; F16C 29/045; F16C 29/046; F16C 29/048; F16C 2322/59
See application file for complete search history.

(56) References Cited

U.S. PATENT DOCUMENTS

| 2,595,482 | A | * | 5/1952 | Palumbo | F16C 29/045 384/49 |
| 4,280,341 | A | * | 7/1981 | Krude | F16C 29/045 384/49 |
| 5,145,262 | A | * | 9/1992 | Morita | F16C 29/04 384/101 |
| 5,439,294 | A | * | 8/1995 | Rixen | F16C 29/005 384/45 |

FOREIGN PATENT DOCUMENTS

| DE | 202012008541 U1 | * | 1/2013 | .......... F16C 29/046 |
| DE | 202016105238 U1 | * | 12/2017 | .......... F16C 33/588 |
| DE | 102017201376 A1 | * | 8/2018 | .......... F16C 29/046 |
| DE | 102017107954 A1 | * | 10/2018 | .......... F16C 29/005 |
| DE | 102017209167 A1 | * | 12/2018 | .............. F16C 19/04 |
| DE | 102017122754 A1 | * | 4/2019 | .......... F16C 29/046 |
| DE | 102017130108 A1 | * | 6/2019 | .......... A47B 88/487 |

* cited by examiner

*Primary Examiner* — Phillip A Johnson
(74) *Attorney, Agent, or Firm* — Zhong Law, LLC

(57) ABSTRACT

In some examples, a slider may include a an inner slider and an outer slider that are engaged with each other via a number of ball bearings. The inner slider may be longitudinally movable along the outer slider to extend the slider. At one end of the slider, the inner slider may include two first stops holding one or more end ball bearings in place. At the other end of the slider, the outer slider may include two second stops holding one or more end ball bearings in place. In such configuration, when the slider is extended in an open mode, the end of the inner slider that stays insider the outer slider will be held in place and engaged with the outer slider by the end ball bearings. This prevents the inner slider from being shaky when the slider is extended.

17 Claims, 4 Drawing Sheets

SLIDER

PRIORITY

This application claims priority to U.S. Provisional Patent Application No. 62/953,890, filed Dec. 26, 2019 entitled "Slider," which is hereby incorporated by reference herein in its entirety and for all purposes.

FIELD

This patent document relates generally to sliders. Examples of slider that can be extended stably are provided.

BACKGROUND

Commercial drawer slides are not designed for robotic competitions. For example, when the slides are extended, the two ends of the inner sliding part will shake because the ball bearings are located in the middle of the slide. This document is directed to systems and methods for addressing the above issues and/or other issues.

BRIEF DESCRIPTION OF THE DRAWINGS

The present solution will be described with reference to the following figures, in which like numerals represent like items throughout the figures.

DETAILED DESCRIPTION

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In some examples, a slider may include a an inner slider and an outer slider that are engaged with each other via a number of ball bearings that roll in the grooves formed by the side of inner and outer sliders. The inner slider may be longitudinally movable along the outer slider to extend the slider. The length of extension of the slider is limited by the lengths of the inner and outer sliders and the number of total ball bearings disposed in between the inner and outer sliders. At one end of the slider, the inner slider may include two first stops holding one or more end ball bearings in place. At the other opposite end of the slider, the outer slider may include two second stops holding one or more end ball bearings in place. In such configuration, when the slider is extended in an open mode, the end of the inner slider that stays inside the outer slider will be held in place and engaged with the outer slider by the end ball bearings. This prevents the inner slider from being shaky when the slider is extended. The details of the slider are further described with reference to FIGS. 1A, 1B, 2, 3A, and 3B.

Figure 1A:
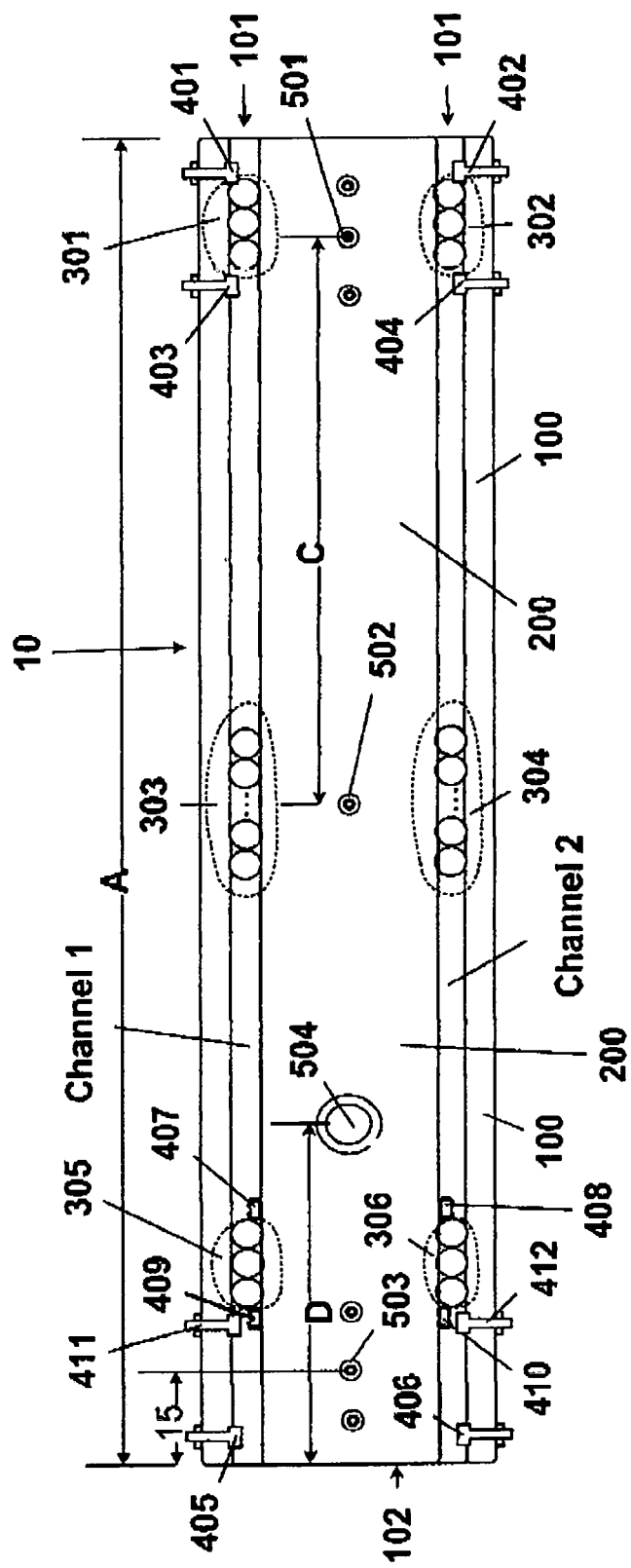
FIG. 1A is a side view and closed mode view of a slider in accordance with various examples described herein.

FIG. 1A is a side view and closed mode view of a slider in accordance with various examples described herein. In some examples, a slider 10 may include an outer slider 100 and an inner slider 200 configured to be engaged with one or more ball bearings (e.g., 301~306) positioned in one or more channels (e.g., channel 1, channel 2) defined by the outer slider and the inner slider. The inner slider 200 may be configured to slide longitudinally relative to the outer slider 100 so that the slider may be configured in a closed mode (e.g., in FIG. 1A) or an open mode (e.g., in FIG. 2). The one or more ball bearings (e.g., 303~306) are disposed in between the channels defined by the outer slider and the inner slider to provide support while the inner slider moves longitudinally. In some examples, a first set of end ball bearings (e.g., 301) may be positioned proximate to a first end of the outer slider (e.g., 101) and held in place between two first stops (e.g., 401, 403). A second set of end ball bearings (e.g., 305) may be positioned proximate to a second end of the inner slider (e.g., 102) and held in place between two second stops (e.g., 407, 409), wherein the second end of the inner slider and the first end of the outer slider are opposite to each other when the inner slider is retracted into the outer slider in the closed mode. As shown in FIG. 1A, in the close mode, the first end of the outer slider 101 and the second end of the inner slider 102 are furthest apart, and are at opposite ends of the slider.

With further reference to FIG. 1A, slider 10 may include a third set of end ball bearings (e.g., 302) positioned proximate to the first end of the outer slider 101 and held in place between two first stops (e.g., 402, 404). The slider 10 may also include a fourth set of end ball bearings (e.g., 306) positioned at the second end of the inner slider 102 and held in place between two second stops (e.g., 408, 410). As will be further explained, the sets of end ball bearings (e.g., 301, 305, 302, 306) secure both ends of the inner slider in the track (e.g., channel 1, channel 2) while the inner slider 200 slides relative to the outer slider 100, to prevent the ends of the inner slider from protruding out of the channel during movement. This facilitates the slide to operate stably when the inner slider reaches its furthest position in the open mode. This technical effect will become further evident in the present disclosure.

Figure 1B:
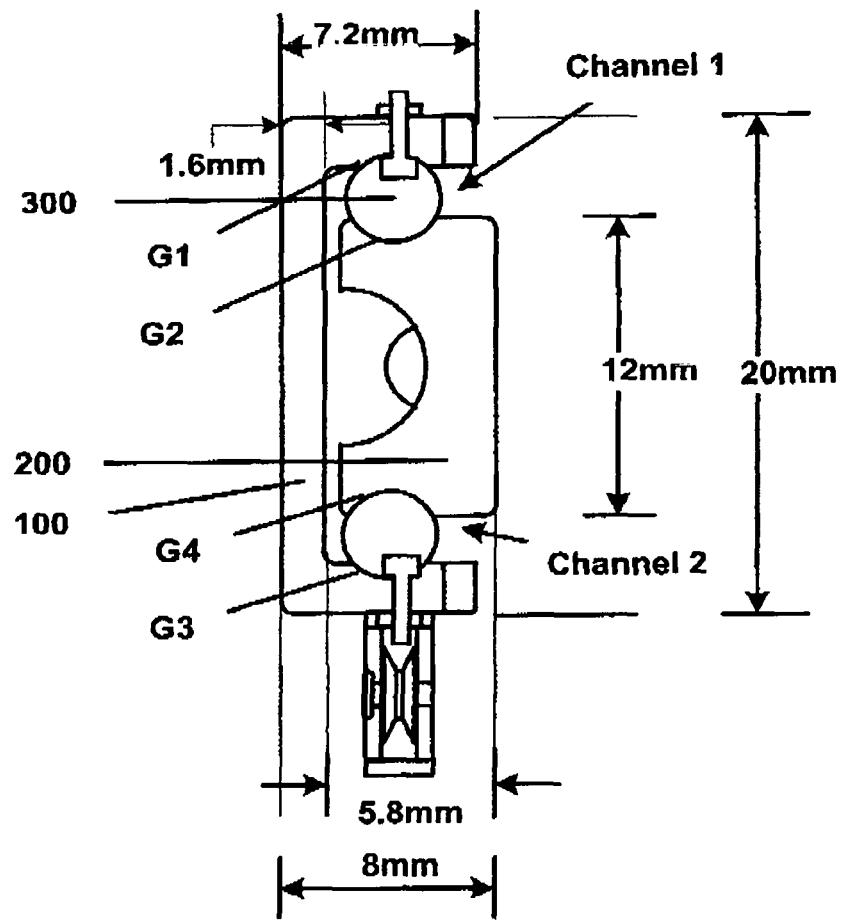
FIG. 1B illustrates a cross-section of the slider in FIG. 1 in accordance with various examples described herein.

FIG. 1B illustrates a cross-section of the slider in FIG. 1A in accordance with various examples described herein. With reference to FIGS. 1A and 1B, a side of the outer slider defines a first groove (e.g., G1) and the inner slider defines a second groove (e.g., G2), and the first and second grooves are facing each other to form a first channel (e.g., channel 1) in between to receive one or more ball bearings. For example, channel 1 holds sets of ball bearings (e.g., 301, 303, 305), where ball bearings 301 are held between stops 401, 403; ball bearings 305 are held between stops 407, 411; and ball bearings 303 may freely move along channel 1, between stops 403, 407. In some examples, a groove (e.g., G3) formed on a side of outer slider 100 and a groove (e.g., G4) formed on a side of inner slider 200 may be positioned to face each other to form a channel (e.g., channel 2). In a similar configuration, channel 2 may hold one or more ball bearings (e.g., 302, 304, 306), where ball bearings 302 are held between stops 402, 404; ball bearings 306 are held between stops 408, 410; and ball bearings 304 may freely move along channel 2, between stops 404, 408.

With further reference to FIGS. 1A-1B, in some examples, the number of ball bearings within each set may vary depending on the length of the slider 10 and the size of the balls in the ball bearings. For example, three ball bearings are shown in each end bearing set 301, 302, 305, and 306 for a twelve inch slider assembly. Other number of ball bearings may also be possible. The number of ball bearings in the set of ball bearings (e.g., 303, 304) may also vary depending on the size of each individual ball bearing, and/or the length of the inner slider or outer slider. For example, a sixteen inch slider (A) may have 35 ball bearings in each set 303, 304. In some examples, the inner slider 200 and outer slider 100 may be configured to be equal in length. For example, a fourteen inch inner slider may be paired with a fourteen inch outer slider.

In some examples, slider 10 may include two pairs of stops (e.g., 401/403 and 402/404) may be placed on the outer slider 100 near an end (e.g., 101). The two stops (e.g., 401, 403) in each stop pair are positioned to hold the corresponding set of ball bearings (e.g., 301) in place relative to the outer slider. Similarly, the two stops (402, 404) are positioned to hold the corresponding set of ball bearings (e.g., 303) in place relative to the outer slider. Such configuration facilitates secure engagement of the inner slider and the outer slider, thus prevents the end of the inner slider from lateral movement (e.g., wiggling up and down) in relation to the outer slider when sliding. In a non-limiting example, the stops may be in the shape of a pin.

In some examples, slider 10 may further include another pair of stops (e.g., 407, 409, or 408, 410) mounted near the end of the inner slider 102. The pairs of stops 407/409 and 408/410 may be configured and function in a similar manner as the stops 401/403 and 402/404, which also facilitates secure engagement of the inner slider and outer slider and prevents the end of the inner slider from lateral movement in relation to the outer slider when sliding. This advantage is apparent with reference to FIGS. 1A and 2, in which the end of inner slider 200 maintains engaged with the outer slider 100 when the inner slider is sliding longitudinally relative to the outer slider. prevent the inner slider from sliding out of the outer slider in the opposite direction (left).

Returning to FIG. 1A, slider 10 may further include one or more stops (e.g., 405, 406) near an end of the outer slider 100, to prevent the inner slider from sliding out of the outer slider at the end of the outer slider (e.g., left side of outer slider 100 in FIG. 1A) when the inner slider slides in a first direction (e.g., left). For example, when the inner slider 200 slides to the left, the stop 409 and/or 410 may be in contact with stops 405 and 406, respectively, effectively stopping the inner slider 200 from further movement. When the inner slider 200 moves in an opposite direction (e.g., sliding right), the set of ball bearings (e.g., 303, 304) will be pushed against each other in between the sets of ball bearings 301/305 or 302/306, to be in touch with the stops 403, 404, respectively, effectively stopping the inner slider 200 from further movement, preventing the inner slider from sliding out of the outer slider 100.

Figure 2:
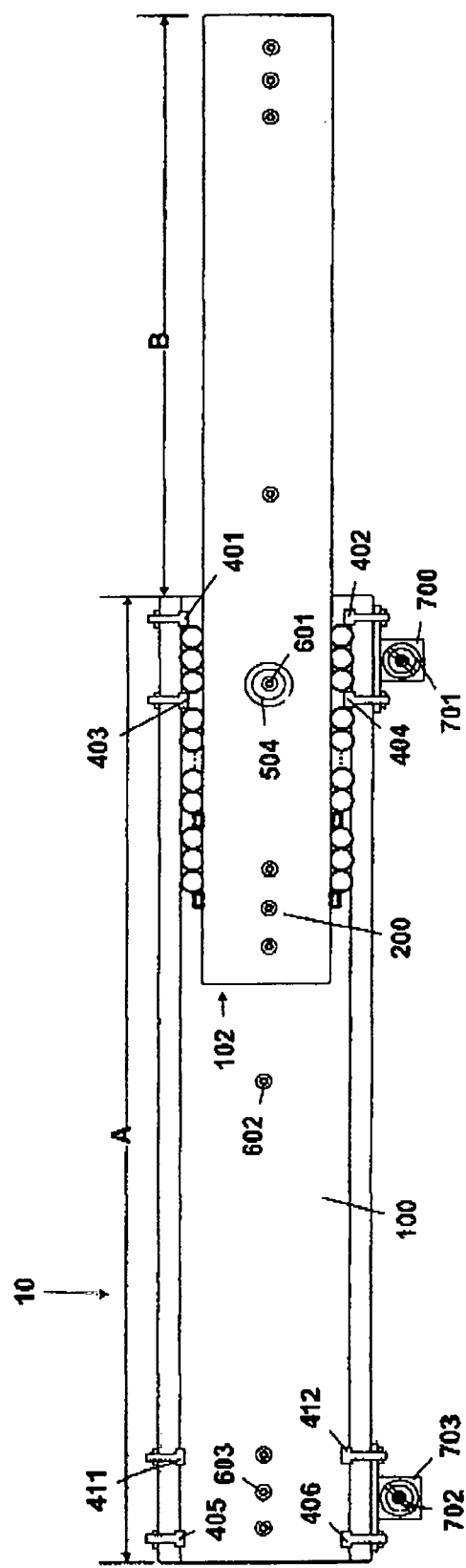
FIG. 2 is an open mode view of the slider in FIG. 1 in accordance with various examples described herein.
Figure 3A:
FIG. 3A illustrates an example of a stop structure in accordance with various examples described herein.

FIG. 3A illustrates an example of a stop structure in accordance with various examples described herein. In some examples, the stop may be any of the stops (e.g., 401-406 shown in FIGS. 1A and 2). A stop may be attached to the outer slider in various ways. For example, as shown in FIG. 3A, the various stops (e.g., 406) may be a bolt fastened to the outer slider through a hole and bolted on an outside surface of the outer slider with a nut. Alternatively, and/or alternatively, the stop may be a screw that is screwed directly to the inner side of the outer slider. In other configurations, the outer slider may include a hollowed cylinder extending from inside surface of the outer slider. The inside of the cylinder may define one or more threads to receive a fastener, e.g., a screw from an outside surface of the slider, the fastener acting as a stop.

Figure 3B:
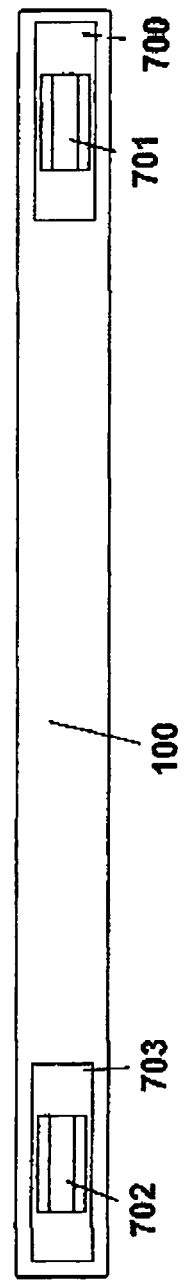
FIG. 3B is a top view of an example outer slider showing a pulley holder mounting assembly in accordance with various examples described herein.

FIG. 3B is a top view of an example outer slider showing a pulley holder mounting assembly in accordance with various examples described herein. With reference to FIGS. 2 and 3B, in some examples, slider 10 may include a pulley holder (e.g., 700) fastened to the outer slider. For example, the pulley holder may be fastened by bolt and nut to the outer slider. The pulley mounted inside of the pulley holder may facilitate a string to extend the slider assembly.

In some examples, the pairs of stops (e.g., 407~410) are notches protruding out of the inner slider to hold the end ball bearings (e.g., 305, 306). In other examples, the pairs of stops (e.g., 407-410) may include pins mounted to the inner slider 200, for example, a bolt nutted to the side of inner slider 200. In some examples, the height of the stops 407-410 may be configured to be not in contact with any of the stops 401-406, 411 and 412.

Returning to FIG. 1A, the inner slider may define one or more mounting holes (e.g., 501~503). These holes may used to fasten other objects upon the slider. The outer slider may also define additional one or more mounting holes (e.g., 601~603). These holes may be used to fasten the slider upon other objects. The inner slider may define at least one larger hole (e.g., 504) to facilitate access to a mounting hole, such as 601~603.

The material of the inner and outer sliders may vary, such as aluminum alloy, steel, plastic, etc. The material used is largely dependent on the purpose the slide was made to serve.

Examples are shown and described with reference to FIGS. 1A, 1B, 2, 3A, and 3B. However, it is also appreciated that variations of the examples described above may be implemented. For example, the slider can be made from many kinds of materials, such as aluminum alloy, steel, plastic, etc. Although some dimensions are shown in FIG. 1B, other length and width of the slider may be possible. The slider may also include multiple inner or outer sliders configured in a similar manner to accommodate extended length.

The various systems and methods disclosed in this patent document provide advantages over existing art, whether implemented, standalone, or combined. For example, the slider described in various embodiments in the present disclosure may be used for drawings to provide steady sliding, supporting heavy drawings in commercial applications. Additionally, the slider may be used for various applications in robotic competitions. For example, two or more sliders as described in the present disclosure may be overlaid to build extendable and stable long sliding system. Additionally, one or more pulley holders may be fastened to the slider (e.g., 700) via two or more stops (e.g., 401, 403, 405, 409, 402, 404, 406, 410) to extend out each slider. Alternatively, those stops may be able to mount other customized objects.

It will be recognized by those skilled in the art that changes, modifications, or combinations may be made to the above-described embodiments without departing from the broad inventive concepts of the invention. For example, the dimensions in FIGS. 1-3 are for illustrations only, and the slider as contemplated by the present disclosure is not limited to any specific size. It should therefore be understood that the present solution is not limited to the particular embodiments described herein, but is intended to include all changes, modifications, and all combinations of various embodiments that are within the scope and spirit of the invention as defined in the claims.

What is claimed is:

1. A slider comprises:
an outer slider;
an inner slider configured to be engaged with the outer slider and movable longitudinally relative to the outer slider;
one or more ball bearings positioned between the outer slider and the inner slider, the one or more ball bearings are movable longitudinally when the inner slider is moving relative to the outer slider;
a first set of end ball bearings positioned at a first end of the outer slider and held in place between two first stops; and
a second set of end ball bearings positioned at a second end of the inner slider and held in place between two second stops, wherein the second end of the inner slider and the first end of the outer slider are opposite to each other when the inner slider is retracted into the outer slider in a closed mode.

2. The slider of claim 1, wherein the outer slider defines a first groove and the inner slider defines a second groove, and wherein the first and second grooves are facing each other to form a first channel in between to receive a first set of the one or more ball bearings.

3. The slider of claim 2, wherein the outer slider defines a third groove on an opposite of the first groove and the inner slider defines a fourth groove on an opposite of the second groove, and wherein the third and fourth grooves are also facing each other to form a second channel in between to receive a second set of the one or more ball bearings.

4. The slider of claim 1 further comprising:
a third set of end ball bearings positioned at the first end of the outer slider and held in place between two third stops; and
a fourth set of end ball bearings positioned at the second end of the inner slider and held in place between two fourth stops.

5. The slider of claim 1, wherein each of the first and second set of end ball bearings includes at least one ball bearing.

6. The slider of claim 1, wherein a length of the inner slider is a same as a length of the outer slider.

7. The slider of claim 6, wherein a number of the one or more ball bearings is based at least on one of a size of the ball bearings and the length of the inner slider.

8. The slider of claim 1, wherein at least one of the first, second, or third stops is a fastener fastened to the respective end of the outer slider.

9. The slider of claim 1 further comprising a pulley holder fastened to the outer slider.

10. The slider of claim 9, wherein the pulley holder is fastened to the outer slider by the fastener that fastens one of the first, second or third stops.

11. The slider of claim 1, wherein at least one of the first and second stops is formed by a notch on the respective end of the inner slider.

12. The slider of claim 1, wherein the outer slider further comprises a closing stop positioned at an opposite end of the first end of the outer slider and configured to limit movement of the inner slider when the slider is in the closed mode.

13. The slider of claim 1, wherein the inner slider defines one or more mounting holes on a side.

14. The slider of claim 1, wherein the outer slider defines one or more mounting holes on a side.

15. The slider of claim 14, wherein the inner slide defines one or more corresponding holes on the side to assist access of the one or more mounting holes on the side.

16. The slider of claim 1, wherein the inner slider, pulley holder, and the outer slider are made of aluminum or steel.

17. A slider comprising:
an inner slider and an outer slider configured to be engaged with each other to form two longitudinal channels; and
one or more ball bearings positioned in each of the two longitudinal channels and are movable along the respective longitudinal channel to allow the inner slider to move longitudinally relative to the outer slider;
wherein the outer slider comprises a first set of end ball bearings positioned at a first end of the outer slider and held in place between two first stops; and
wherein the inner slider comprises a second set of end ball bearings positioned at a second end of the inner slider and held in place between two second stops, wherein the second end of the inner slider and the first end of the outer slider are opposite to each other when the inner slider is retracted into the outer slider in a closed mode.

* * * * *